July 20, 1965  A. T. ABROMAITIS  3,196,273
ULTRAVIOLET DETECTOR WITH R.C. MEANS TO PREVENT
OVERHEATING OF THE ELECTRODES
Filed March 14, 1963  2 Sheets-Sheet 1

INVENTOR.
ANDRE T. ABROMAITIS
BY George H. Fritzinger
AGENT

United States Patent Office 3,196,273
Patented July 20, 1965

3,196,273
ULTRAVIOLET DETECTOR WITH R.C. MEANS TO PREVENT OVERHEATING OF THE ELECTRODES
André T. Abromaitis, Morristown, N.J., assignor to Mc-Graw-Edison Company, Elgin, Ill., a corporation of Delaware
Filed Mar. 14, 1963, Ser. No. 265,177
3 Claims. (Cl. 250—83.6)

This invention relates to ultraviolet detector systems which use ultraviolet detector tubes of the type described in the Howling Patent No. 3,047,761, dated July 31, 1962. More particularly, the invention relates to a circuit improvement for such ultraviolet detector systems which enables a substantial increase in sensitivity to be obtained at subsaturation levels of incident ultraviolet radiation. For purposes of the present description, the phrase "saturation level" is herein used to mean the intensity of incident ultraviolet flux radiation which will trigger the detector tube within about one-half millisecond when the voltage applied across the tube is at a firing potential. Intensities of radiation above saturation are herein referred to as "supersaturated" and below saturation as "subsaturated."

In the present ultraviolet detector systems the ultraviolet detector tube is operated from a source of pulsating voltage wherein each pulse reaches at least a firing potential and falls below a sustaining potential to quench the tube. The tube may have symmetrical electrodes so that each electrode may operate equally well as cathode or anode. A pulsating voltage for the purposes of the present invention is herein considered as constituting either the positive and negative half-cycle pulses of an A.C. source of potential, or the D.C. pulses obtained from an A.C. source of potential through a half-wave or full-wave rectifier. The advantage of operating the ultraviolet detector tube in such pulsating circuits is that the tube at the end of each applied voltage pulse is quenched by the voltage falling below the sustaining value. By quenching the tube in this manner, the operating circuit is permitted to be designed for maximum power transfer without limitation as to any quenching problem.

In the present ultraviolet detector systems the value of the impedance elements used in the operating circuit is relatively low compared to the internal resistance of the ultraviolet detector tube before the tube is fired with the result that until the tube is fired nearly the whole of the applied voltage appears across the tube. The question of whether the tube will fire at substantially the instant each applied voltage pulse reaches a firing potential is dependent therefore solely on whether the incident light flux has reached a saturation level.

Once the ultraviolet detector tube is fired it continues to discharge independently of the incident light flux until the applied potential falls below the sustaining value. For example, an ultraviolet detector tube filled with an ionizing gas which is substantially pure hydrogen has a firing potential of the order of 700 volts and a sustaining potential of the order of 330 volts.

For any given operating circuit the steady state discharge current through the ultraviolet detector tube remains essentially constant for incident light flux intensities at saturation and super-saturation levels. If the sensitivity of the ultraviolet detector system is defined as the ratio of the discharge current to the incident light flux the sensitivity falls as the incident light flux increases above a saturation level. The maximum permissible sensitivity at a saturation level of incident light flux is determined by the maximum steady state discharge current which the tube can carry over a sustained period of time without overheating the electrodes to a point where they emit electrons thermionically. It is required that thermionic emission be avoided because it would cause the detector tube to lock on—i.e., to continue to discharge during each applied voltage pulse after the incident light flux radiation has ceased. In order to so limit the maximum steady state current at saturation levels of incident light flux, it has been the practice to insert in series with the tube a fixed circuit limiting resistor of an appropriate value typically of the order of about 40,000 ohms.

A more important measure of the sensitivity of the present ultraviolet detector system is the ratio of the discharge current to the incident light flux intensity at intensities below the saturation level. For the present description this sensitivity is referred to as the "sub-saturation sensitivity" of the ultraviolet detector system.

A very detrimental effect of adding a current-limiting resistor in the operating circuit to safeguard against overheating of the electrodes as heretofore employed, is that it reduces markedly the sub-saturation sensitivity of the ultraviolet detector system. The present invention resides in a circuit improvement which increases substantially the sub-saturation sensitivity of the ultraviolet detector system while still safeguarding the ultraviolet detector tube against "lock-on" should the tube be subjected to incident light flux at or above a saturation level over a sustained period of time. In carrying out the invention the fixed current limiting resistor heretofore used is reduced in magnitude or eliminated to increase the initial sensitivity to any oncoming ultraviolet radiation, and a safeguarding means is inserted in the circuit which has a time variable current limiting capability which increases with flow of the discharge current. In a preferred embodiment of the invention this time variable current limiting means acts to cause the effective voltage applied across the ultraviolet detector tube to be decreased automatically in response to the current flow. The time constant of this time variable current limiting means is adjusted so that the initial high level discharge current responsive to an oncoming ultraviolet radiation will flow long enough to operate a load circuit device such as an electromagnetic relay but not long enough responsive to a continuing incident radiation to permit the electrodes to become overheated.

As will appear, the time variable current limiting means may take the form simply of a parallel R.C. network connected in a D.C. portion of the operating circuit. If the ultraviolet detector tube is operated across an A.C. voltage source the R.C. network is connected serially in the circuit through suitable rectifying means. If the ultraviolet detector tube is operated across a D.C. pulsating voltage the R.C. safeguarding network may be connected directly in series with the ultraviolet detector tube. In any case the operation of the R.C. safeguarding network is to build up a counter E.M.F. in the circuit responsive to the initial current flow at a rate dependent upon the charge time constant of the network in the circuit. As such counter E.M.F. builds up not only is the effective applied voltage reduced but also the tube fires later and stops discharging sooner during each voltage pulse to give a sharp reduction in the average value of the discharge current.

An object of the invention is to provide an improved operating circuit which permits an ultraviolet detector tube to be operated with greater effective sensitivity from both A.C. and pulsating D.C. voltage sources.

Another object is to provide such improved operating circuit which has an inherent capability of safeguarding the ultraviolet detector tube from being overheated when the tube is fired consecutively over a sustained period of time.

Another object is to provide such improved operating circuit with a safeguarding means which builds up a counter E.M.F. responsive to initial current flow through the ultraviolet detector tube to safeguard the electrodes of the tube against being overheated.

Another object of the invention is to provide an improved ultraviolet detecting system which has a marked improvement in sensitivity to ultraviolet radiation at sub-saturation levels.

These and other objects and features of the invention will be apparent from the following description and the appended claims.

In the description of the invention reference is had to the accompanying drawings, of which:

Figure 1:
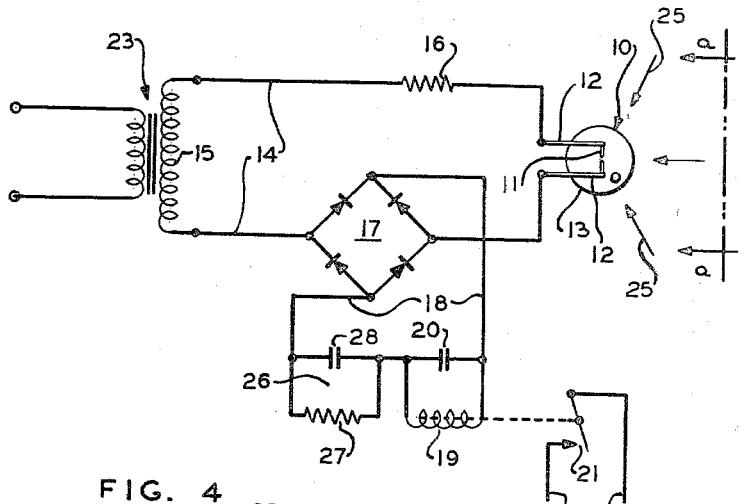
FIGURE 1 is a schematic circuit diagram of a circuit according to the invention for operating an ultraviolet detector tube from an A.C. source of voltage.
Figure 1A:
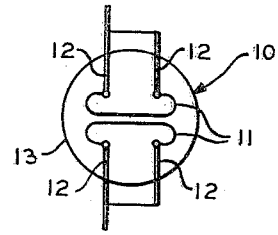
FIGURE 1a is a fractional view illustrating a preferred configuration of the electrodes of the ultraviolet detector tube as seen from the line a—a of FIGURE 1.

The embodiment of the invention shown in FIGURES 1 and 1a includes an ultraviolet detector tube 10 having two symmetrical wire electrodes 11 provided with rounded end portions secured to respective supporting pins 12 and with adjacent parallel intermediate portions forming a working region in which the emission of an electron when a firing potential is applied across the tube will produce an avalanche discharge. The electrodes are supported in a glass envelope 13 pervious to ultraviolet light. The envelope 13 is filled to a desired pressure with a suitable ionizing gas such as of pure hydrogen or of hydrogen with a noble gas such as helium or neon, the particular ionizing gas which is used depending upon the operating characteristics desired. For A.C. operation this detector tube has about equal sensitivity to photon radiation within a 120° cone of vision about a center line perpendicular to the plane of the electrodes as indicated by the arrows 25 in FIGURE 1.

An A.C. potential of the order of 700 volts R.M.S.— 1000 volts peak—may be obtained from a 60 cycle 110 volt line through the step-up power transformer 23. Since the voltage from a nominal 110 volt power line will normally vary from about 100 volts to a maximum of 132 volts, the maximum R.M.S. voltage in the operating circuit 14 will be of the order of 840 volts and the maximum peak voltage of the order of 1200 volts.

As aforementioned, when the tube is subjected to incident photon radiation at a saturated level, it will fire within about one-half millisecond after the applied voltage across the tube reaches 700 volts and the discharge continues until the applied potential falls below the sustaining value of 330 volts. The instant the tube fires the voltage drop across the tube falls to the sustaining value, leaving the remaining voltage from the source applied across the impedance elements in the operating circuit. The effective impedance comprises that of the load device 19 plus whatever current-limiting resistance is required. It is desired that the current-limiting resistance be as low as possible not only so that a maximum power transferal to the load device is obtained but also that the effective sensitivity of the tube may be at its maximum. However, to prevent overheating the electrodes of the ultraviolet detector tube should the tube be subjected to a saturated level of photon radiation and the voltage of the A.C. potential source be at a maximum, the current-limiting resistor 16 has heretofore had a value of the order of 40,000 ohms.

By the present invention, the current-limiting resistor 16 can be reduced typically to about one-quarter or less of its former value to obtain at least three times greater effective sensitivity without incurring any overheating of the electrodes should the radiation intensity rise to a saturation level and the voltage source rise to its maximum value. This safeguarding action against overheating of the electrodes is attained preferably by a parallel R.C. network 26 connected to the load circuit 18. The R.C. network comprises a resistance 27 having a value typically of about 40,000 ohms and a condenser 28 having a value typically of about .3 microfarad. Such an R.C. network has a time constant of about 12 milliseconds to enable the condenser to become charged to a threshold level to bring the resistor 27 effectively into the circuit in series with the current-limiting resistor 16 before the electrodes can become overheated. From another standpoint, the safeguarding action of the R.C. network 26 may be described as being due to the counter E.M.F. which builds up in the circuit as the condenser 28 acquires a charge. The action of this counter E.M.F. is to delay the instant during each half cycle when the ultraviolet detector tube begins to conduct and to advance the time when it is quenched whereby to limit the current to a level below that which would cause thermionic emission from the electrodes.

Figure 3:
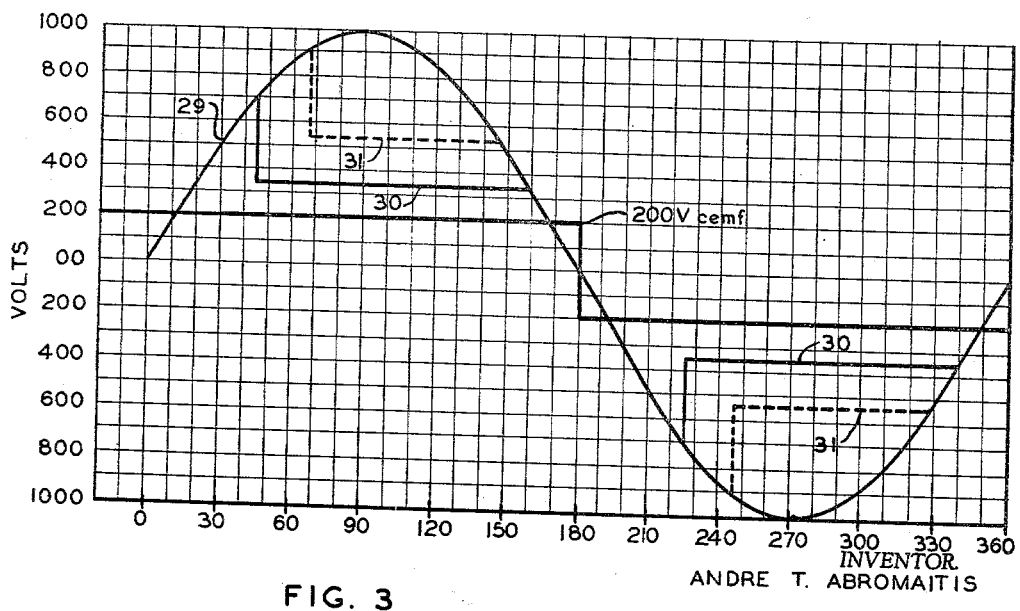
FIGURE 3 is a graph showing the current discharge pulses during two successive applied voltage pulses at a saturation level of incident ultraviolet flux for a prior art operating circuit and for an operating circuit incorporating the present invention.

The safeguarding action is illustrated by reference to FIGURE 3 wherein the sinusoidal curve 29 represents two half cycles of an applied A.C. voltage. When the potential during each half cycle reaches approximately 700 volts the ultraviolet detector tube fires and the voltage drop across the tube falls according to the line 30, it being understood that the difference in potential between the line 30 and the applied potential line 29 represents the voltage drop across the impedance elements in series with the ultraviolet detector tube. Since we here represent the ultraviolet detector tube as firing when the applied potential reaches 700 volts we are considering the incident ultraviolet radiation as being at a saturation level. If we next consider the R.C. safety network 26 as being included in series with the load device and that under the saturating condition the steady state charge voltage which develops across the condenser 28 is 200 volts then the ultraviolet detector tube will not fire during each voltage pulse until the applied potential reaches 900 volts and the tube will be quenched when the applied potential falls to 530 volts, leaving therefore a voltage applied across the circuit elements in series with the ultraviolet detector tube which is the difference between the dotted line 31 and the applied potential line 29. As is apparent, not only is the magnitude of the voltage across the load device reduced but also the duration of each current pulse is shortened. This double action permits a high initial sensitivity to be attained without encountering a condition which would result in overheating the electrodes.

Figure 2:
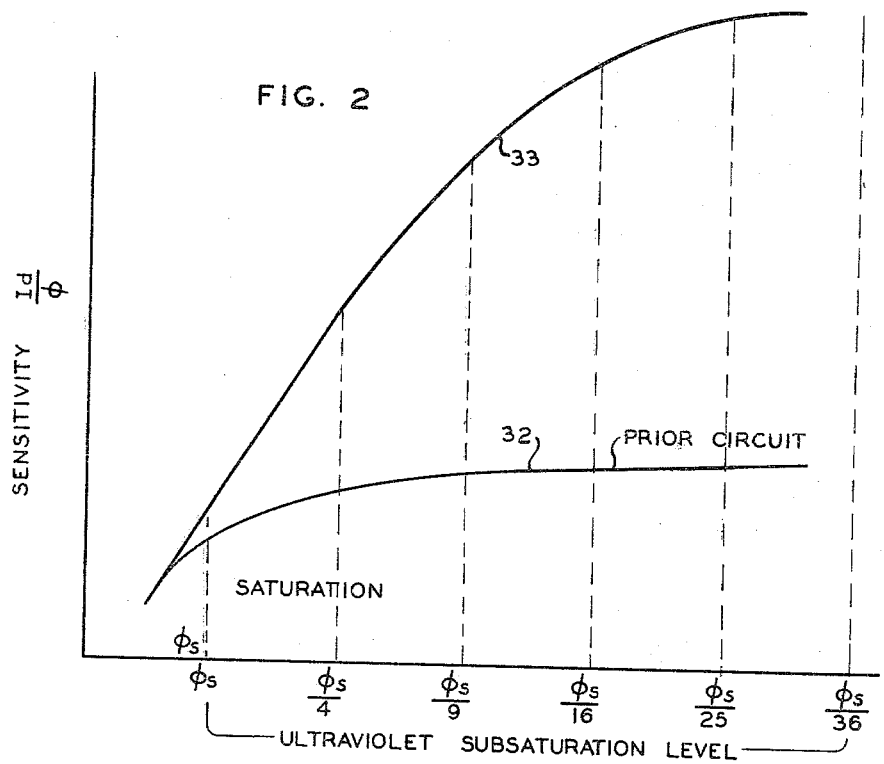
FIGURE 2 is a graph of sensitivity versus ultraviolet flux radiation at sub-saturation levels for the prior art operating circuit and for an operating circuit incorporating the present invention.

The increase in relative sensitivity is shown by the graph of FIGURE 2 wherein the line 32 represents the sensitivity of the operating circuit of FIGURE 1 when the R.C. safety circuit is eliminated and the resistor 16 has a value of 40,000 ohms. The sensitivity of this detector circuit is increased according to the line 33 of FIGURE 2 when the value of the resistor 16 is reduced to 10,000 ohms and the R.C. safety network is inserted as shown. Further, by reference to FIGURE 2, it will be seen that the sensitivity of both circuits merge into a common line when the incident ultraviolet radiation increases to a saturation level.

As further detailed description of the operation of the circuit of FIGURE 1, it has been found that when the relay 19 has a coil with approximately 10,000 ohms resistance and an operate time of a few milliseconds at 2.5 milliamperes of current, the relay will close after about 5 current pulses—i.e., in two and one-half cycles of applied potential. It requires however a substantially greater number of such current pulses to produce overheating of the electrodes. I have found that an R.C. time constant for the safeguarding R.C. network 26 of the order of 12 milliseconds is a preferred value in providing a substantial increase in effective sensitivity while still safeguarding against any possible overheating of the electrodes. This 12 millisecond time constant is the discharge time constant for the condenser 28 in the R.C. network 26. The charge time constant of the condenser 28 in the operating circuit is substantially less, being of the order of 3 milliseconds. The use of a longer discharge time constant than of a charge time constant is advantageous in correlating the dropout of the safeguarding action in accord with the delay in the heat dissipation from the electrodes when for any reason the tube is not fired consecutively as because of a low level of incident radiation. It will be understood however that a wide variation in the charge and discharge time constants of the condenser 28 in the operating circuit is permissible while still enabling a marked benefit to be achieved by the invention.

Figure 4:
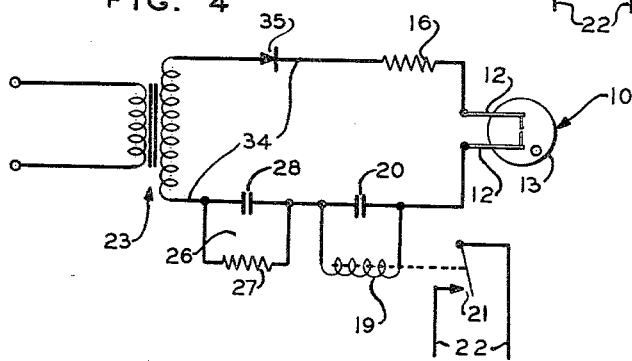
FIGURE 4 is a schematic circuit diagram showing a circuit according to the invention for operating the ultraviolet detector tube from a pulsating half-wave source of potential.

In the embodiment of the invention shown in FIGURE 4 there is employed a simpler operating circuit 34 having a single rectifier 35 in series with the ultraviolet detector tube to operate the tube from half-wave D.C. voltage pulses. In series also with the ultraviolet detector tube is the load relay 19 shunted by the filter condenser 20 and the R.C. safeguarding network 26. Since the D.C. voltage pulses fall substantially to zero the tube 10 is quenched in the manner as before described. The circuit elements may also have the same typical values as before described in connection with the circuit of FIGURE 1. The operation of the circuit and the benefits obtained from the invention are therefore as before described. However, since the applied voltage pulses occur during alternate half cycles in this embodiment less average current will flow for any given level of photon radiation to reduce the sensitivity. A change in the value of the components of the safeguarding network as by decreasing the resistor 27 will improve the operation.

Figure 5:
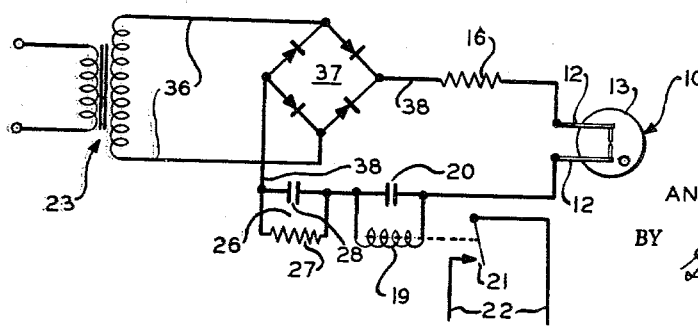
FIGURE 5 is a schematic circuit diagram showing a circuit according to the invention for operating the ultraviolet detector tube from a pulsating full-wave source of potential.

In the embodiment of the invention shown in FIGURE 5 the secondary of the transformer 23 is connected to a circuit 36 including a full-wave rectifier 37. This rectifier in turn feeds into a load circuit 38 which serially includes the current-limiting resistor 16, the ultraviolet detector tube 10, the load relay 19 shunted by the condenser 20 and the safeguarding circuit 26. The ultraviolet detector tube 10 is quenched after each half cycle as in the preceding circuit. Since the applied voltage pulses are at the same frequency as in the circuit of FIGURE 1 the circuit elements may have the same value as in that embodiment to produce equivalent results.

In each of the embodiments above-described the operating circuit allows large pulses of current to flow initially at low radiation levels to give a high effective sensitivity and it reduces the current pulses at high radiation levels at high values of applied voltage to reduce then the current flow whereby to protect the ultraviolet detector tube against such overheating as might lead to lock-on of the tube.

The embodiments of the invention hereindescribed are intended to be illustrative and not limitative of the invention since the same are subject to changes and modifications without departure from the scope of the invention, which I endeavor to express according to the following claims.

I claim:
1. An ultaviolet detector system comprising an ultraviolet detector tube having symmetrical electrodes in an adjacent relationship providing a working region wherein an emission of electrons responsive to incident photons is capable of triggering an avalanche discharge when a firing potential is applied across the electrodes, an electrical circuit serially including an A.C. source of potential of a peak value exceeding said fire potential, a current-limiting resistor, said ultraviolet detector tube, a rectifier and a load device, said current-limiting resistor having a value insufficient to prevent overheating of said electrodes when said tube is fired consecutively responsive to a saturating level of incident photon radiation over a given period of time, and a parallel R.C. network connected in said circuit in series with said rectifier, said R.C. network having a time constant of substantially less than said period causing the condenser thereof to become substantially charged to a threshold level in less than said given period when the incident photon radiation is at said saturating level whereby to introduce effectively a counter E.M.F. in said electrical circuit effective together with the current-limiting action of said current-limiting resistor to prevent overheating of said electrodes during consecutive firing of said ultraviolet detector tube over a sustained period of time.

2. The ultraviolet detector system set forth in claim 1 wherein said load device comprises an electrical relay which requires a series of consecutive current discharge pulses through said ultraviolet detector tube over a predetermined period of time to operate the relay, and wherein the discharge time constant of said R.C. network is substantially less than said predetermined period.

3. An ultraviolet detector system comprising an ultraviolet detector tube having electrodes in an adjacent relationship providing a working region wherein an emission of electrons responsive to incident photons is capable of triggering an avalanche discharge when a firing potential is applied across the electrodes, an electrical circuit including an A.C. source of potential, said detector tube and a rectifier, a load circuit connected to said electrical circuit in series with said rectifier and including a load device, said ultraviolet detector tube being characterized in that said electrodes become overheated when said tube is fired consecutively responsive to a saturating level of incident photon radiation over a given period of time, and a parallel R.C. network connected serially in said load circuit and having a time constant substantially less than said given period to cause the condenser thereof to become substantially charged to a threshold level in less than said given period when the incident photon radiation is at said actuating level.

References Cited by the Examiner
UNITED STATES PATENTS

| | | | |
|---|---|---|---|
| 1,799,993 | 4/31 | Staege | 315—245 |
| 2,517,599 | 8/50 | Reeves | 315—245 |
| 2,944,152 | 7/60 | Johnson | 250—83.6 |
| 2,998,774 | 9/61 | Gibson | 315—245 X |
| 3,041,458 | 6/62 | Roxberry | 250—83.3 |
| 3,103,589 | 9/63 | Howling | 250—83.6 |

RALPH G. NILSON, *Primary Examiner.*

JAMES W. LAWRENCE, *Examiner.*